(12) United States Patent
Longdill et al.

(10) Patent No.: US 7,322,864 B2
(45) Date of Patent: Jan. 29, 2008

(54) AMPHIBIOUS VEHICLES WITH RETRACTABLE WHEELS

(75) Inventors: Simon James Longdill, Auckland (NZ); Hans Weekers, Auckland (NZ); Stephen John Briggs, Auckland (NZ); Terence James Roycroft, Waiuku (NZ)

(73) Assignee: Gibbs Technologies Ltd., Nuneaton, Warwickshire (GB)

( * ) Notice: Subject to any disclaimer, the term of this patent is extended or adjusted under 35 U.S.C. 154(b) by 0 days.

(21) Appl. No.: 11/255,775

(22) Filed: Oct. 21, 2005

(65) Prior Publication Data

US 2006/0189224 A1    Aug. 24, 2006

(30) Foreign Application Priority Data

Oct. 22, 2004    (GB)    ................... 0423470.4

(51) Int. Cl.
*B60F 3/00* (2006.01)
*B60H 19/08* (2006.01)

(52) U.S. Cl. .................... 440/12.54; 440/12.5
(58) Field of Classification Search .......... 440/12.5, 440/12.54; 244/101, 102 A, 102 R
See application file for complete search history.

(56) References Cited

U.S. PATENT DOCUMENTS

| | | | |
|---|---|---|---|
| 1,523,675 A * | 1/1925 | Towle | .................... 244/102 R |
| 2,781,529 A | 2/1957 | Moody | |
| 3,280,785 A | 10/1966 | Mycroft | |
| 3,421,472 A | 1/1969 | Oberg | |
| 3,903,831 A | 9/1975 | Bartlett et al. | |
| 4,241,686 A | 12/1980 | Westphalen | |
| 4,958,584 A | 9/1990 | Williamson et al. | |
| 5,690,046 A | 11/1997 | Grzech | |
| 6,394,017 B2 | 5/2002 | Pavon | |
| 6,540,569 B1 | 4/2003 | Gong | |
| 2003/0047899 A1 * | 3/2003 | Gibbs | .................. 280/124.157 |
| 2005/0239351 A1 * | 10/2005 | Darby et al. | ............. 440/12.51 |
| 2007/0006788 A1 * | 1/2007 | Lindsey | ...................... 114/288 |

FOREIGN PATENT DOCUMENTS

| | | | |
|---|---|---|---|
| GB | 2397555 A | * | 7/2004 |
| GB | 2397555 A | * | 7/2004 |
| JP | 2004349009 | | 12/2004 |
| WO | WO 2004103743 | | 2/2004 |

* cited by examiner

*Primary Examiner*—Lars A. Olson
*Assistant Examiner*—Daniel V Venne
(74) *Attorney, Agent, or Firm*—Fulwider Patton LLP

(57) ABSTRACT

Amphibious vehicle having road wheels which are retractable to allow planing. Each wheel suspension is protractable through a gap in the planing surface of the hull. To reduce hydrodynamic drag and improve marine handling, covers are provided which cover such gaps when the wheels are retracted. These covers may be hinged parallel to a longitudinal, or to a transverse, axis of the vehicle or may be otherwise connected to the hull.

20 Claims, 8 Drawing Sheets

AMPHIBIOUS VEHICLES WITH RETRACTABLE WHEELS

CROSS-REFERENCES TO RELATED APPLICATIONS

This application claims priority from Great Britain Application Serial No. 0423470.4, filed Oct. 22, 2004.

BACKGROUND OF THE INVENTION

The present invention relates to amphibious vehicles, and particularly to hull fairings for recesses in the hull.

In our co-pending Patent Application No. PCT/GB/04/002156, a planing amphibious vehicle hull is shown with recesses in the areas where retractable wheels and their suspensions move during suspension retraction and protraction. Because the suspensions are assembled from below during manufacture, the recesses intrude considerably into the planing surfaces of the hull. In order to reduce this intrusion, plates are fixed across part of each recess after assembly of the suspension. These plates are currently glued into position, although they could be bolted. As will be seen from FIG. 1 of the above prior application, it is clear that particularly the front wheel recesses are very much open at the bottom. As a result of the openings in the bottom of the hull, there can be problems with drag on the hull when the vehicle tramps through rough water. This is particularly problematic for vehicles smaller and lighter than that shown in the prior application.

A further known solution to this problem of reducing drag on water is disclosed in U.S. Pat. No. 4,958,584, to Williamson. In this patent, a single sliding cover 18 (FIG. 5) for front and back wheel wells 42 on one side of the vehicle is powered fore and aft by a double acting hydraulic cylinder 148. This arrangement appears to be a very simple and elegant solution, but has considerable practical drawbacks.

First, the slide channels will be susceptible to damage or seizure due to ingress of sand or silt. Second, the cover runs parallel to the hull for most of its length; so any grounding or collision damage which distorts either the hull or the cover would be liable to cause the two parts to jam together, preventing protraction of the wheels and stranding the vehicle on water.

Third, the use of a single actuator to move such a large and complex sliding panel is liable to lead at the least to uneven panel movement, and at the most to complete seizure, especially as wear and play build up as the vehicle ages. Finally, a single cover as shown, which overlaps the hull between front and rear arches even when closed, would project below the hull at the front, at least, of each wheel arch, disturbing the smooth flow of water along the vehicle's planing surface. Clearly, fresh thinking is needed.

An object of the invention is, therefore, to further reduce drag on an amphibious vehicle when in water.

SUMMARY OF THE INVENTION

According to the invention, there is provided an amphibious vehicle having retractable road wheels each mounted by means of a wheel suspension to a vehicle body, the body having a planing bottom, wherein the bottom has for each suspension an interruption in the bottom through which at least a part of the suspension can move during retraction or protraction of its said road wheel, characterised in that the interruption is arranged to be substantially covered by a cover which is engaged by the part of the wheel suspension during wheel protraction so that the cover at least partially opens on wheel protraction.

The fixture of the cover to the body of the vehicle may be hinged by means of a hinge or hinges, with hinge axes parallel to either the vehicle's longitudinal axis, or to its transverse axis. Alternatively, the cover may be movably arranged on a suitable linkage.

In a preferred arrangement, the cover is connected to a lower suspension member, so that when protracting the wheels, the lower suspension member carries the cover down with it. The linkage between the suspension member and cover may be extensible, so that when retracting the wheels, the suspension member may retract into the interruption in the hull; while the cover is constrained to remain flush with the hull surface.

The covers may be hollow bodies, which provide buoyancy to the vehicle on water. In this case, the covers may be made of blow moulded plastic. Alternatively, they may have buoyancy foam attached. The covers may also be profiled to match the hull planing surface, with features like strakes continued across the cover surfaces.

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

Figure 1:
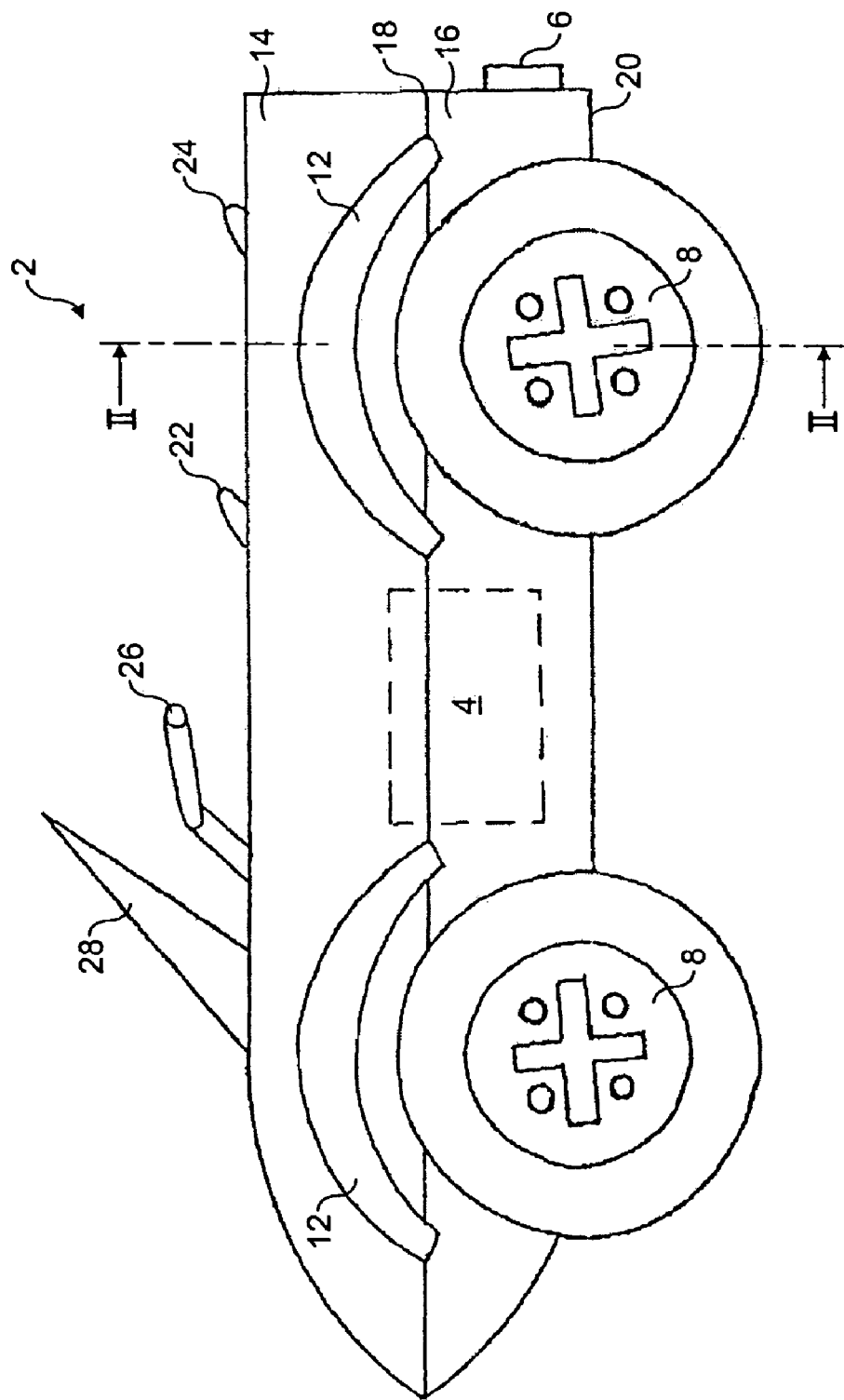
FIG. 1 is a diagrammatic side elevation view of an amphibious vehicle according to the invention.

Amphibious vehicle 2 has a prime mover 4 driving a pump jet 6 through a marine transmission. Locomotion on road is provided by wheels 8, which are driven through a road transmission. The wheels are shielded by wheel arches 12. The vehicle body comprises an upper body 14 and a hull 16, which are formed separately and joined at split line 18.

A chassis is also provided, as is described below. If this chassis is bonded to the bodywork, it may be regarded as part of the overall body structure. The hull has a planing surface 20. A driver's seat 22 is provided with one or more passenger seats 24 astern of the driver's seat. The seating axis is on the longitudinal axis of the vehicle, or parallel thereto. The axis of the prime mover is also along, or parallel to, the longitudinal axis of the vehicle. Driver controls are provided, in this case handlebars 26. A windscreen 28 is provided for weather and spray protection.

Figure 2:
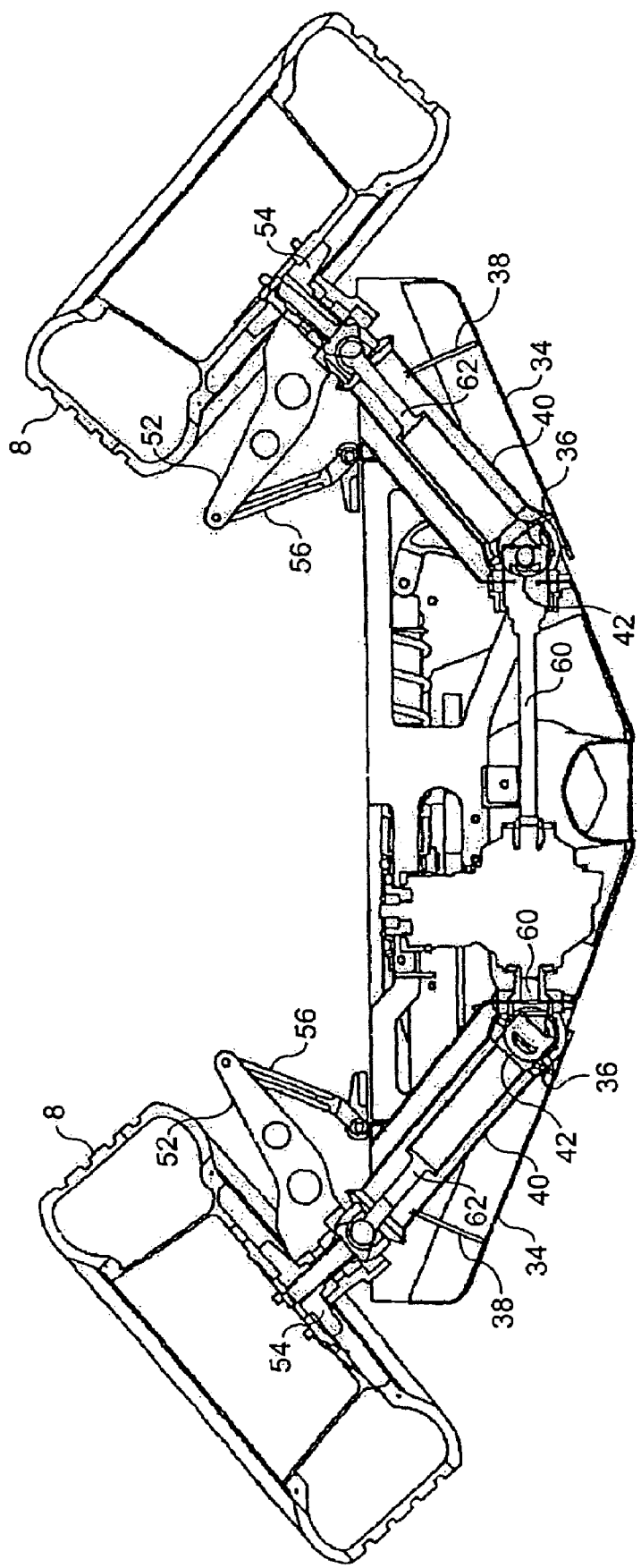
FIG. 2 is a transverse cross section through plane II-II of the vehicle of FIG. 1 according to a first embodiment of the invention, with the wheels retracted.
Figure 3:
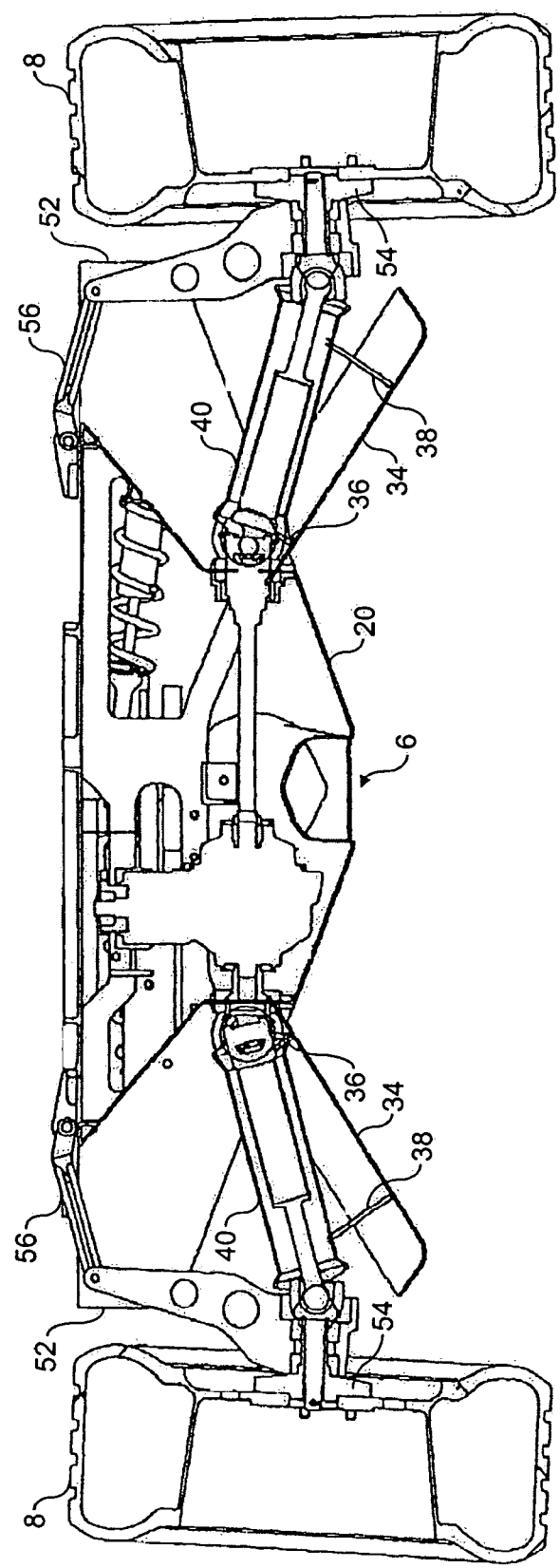
FIG. 3 is a transverse cross section through plane II-II of the vehicle of FIG. 1 according to a first embodiment of the invention, with the wheels protracted.

FIGS. 2 and 3 show a pair of rear wheels 8 mounted on hubs 54. The hubs are driven by intermediate shafts 62 and layshafts 60, which are driven from the prime mover 4. The intermediate shafts are supported inside lower suspension members 40 respectively which are each in the form of a tube. The tubelike members 40 are pivotally mounted at their inner ends on bearings 42. The outer ends of members 40 are connected to upright members 52, which carry hubs 54. Upper suspension members 56 connect between vehicle chassis 30 and upright members 52.

Figure 4:
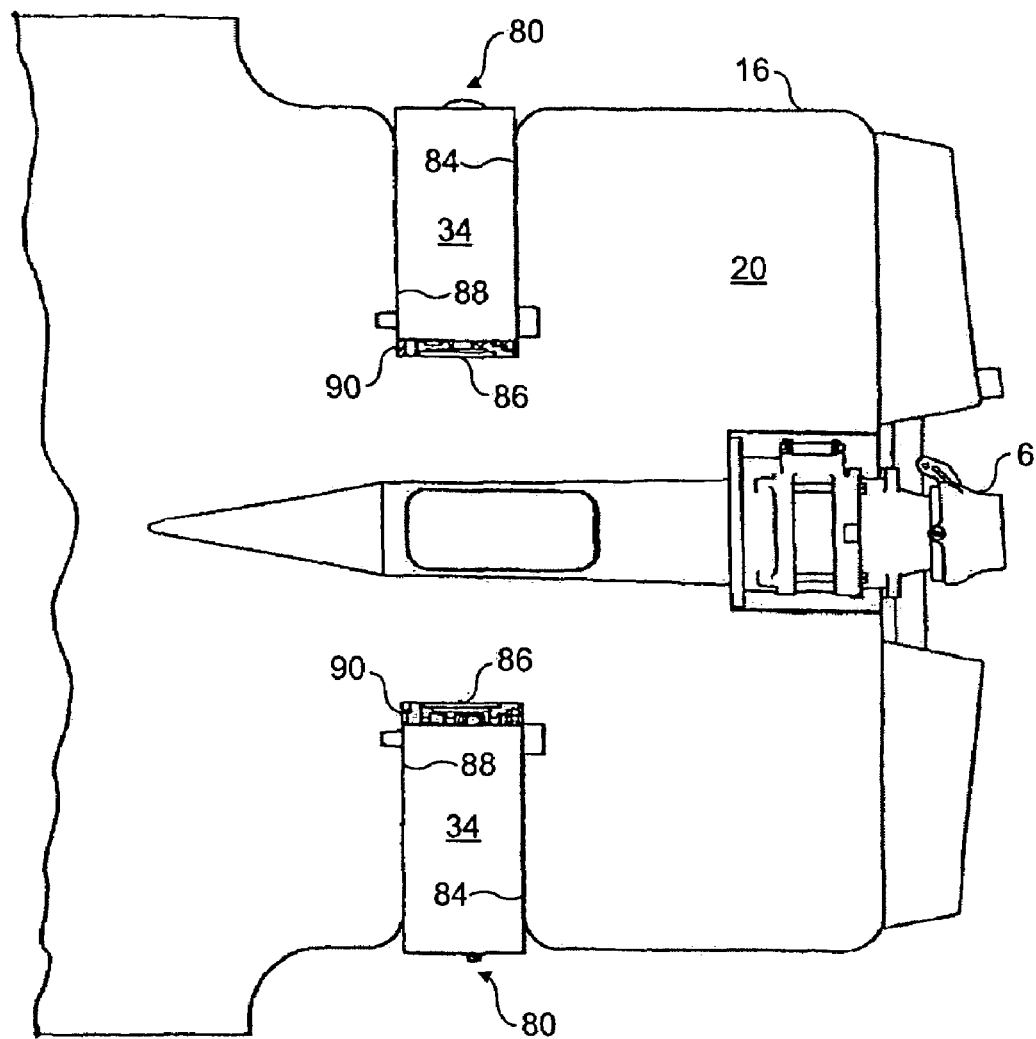
FIG. 4 is a view from below the vehicle of FIG. 1 with the wheels retracted.

As can be seen in FIG. 4, hull 16 has a planing bottom 20, in which there are gaps 80 (which are apertures leading to slots formed in the vehicle body) forming interruptions in the bottom through which lower suspension members 40 can move, from a retracted position of the wheels as shown in FIG. 2, to a protracted or wheels down position as shown in FIG. 3.

Fixed to lower suspension members 40 are covers 34, which are fixed by means of inner and outer brackets 36 and 38 (FIG. 3) to members 40, so that the covers pivot about bearings 42. The gaps 80 are defined by body edges 84, 86, and 88. Covers 34 when closed substantially fill gaps 80, only leaving small clearance gaps 90 necessitated by the need to distance the outer faces of the covers from the centres of bearings 42.

Figure 5:
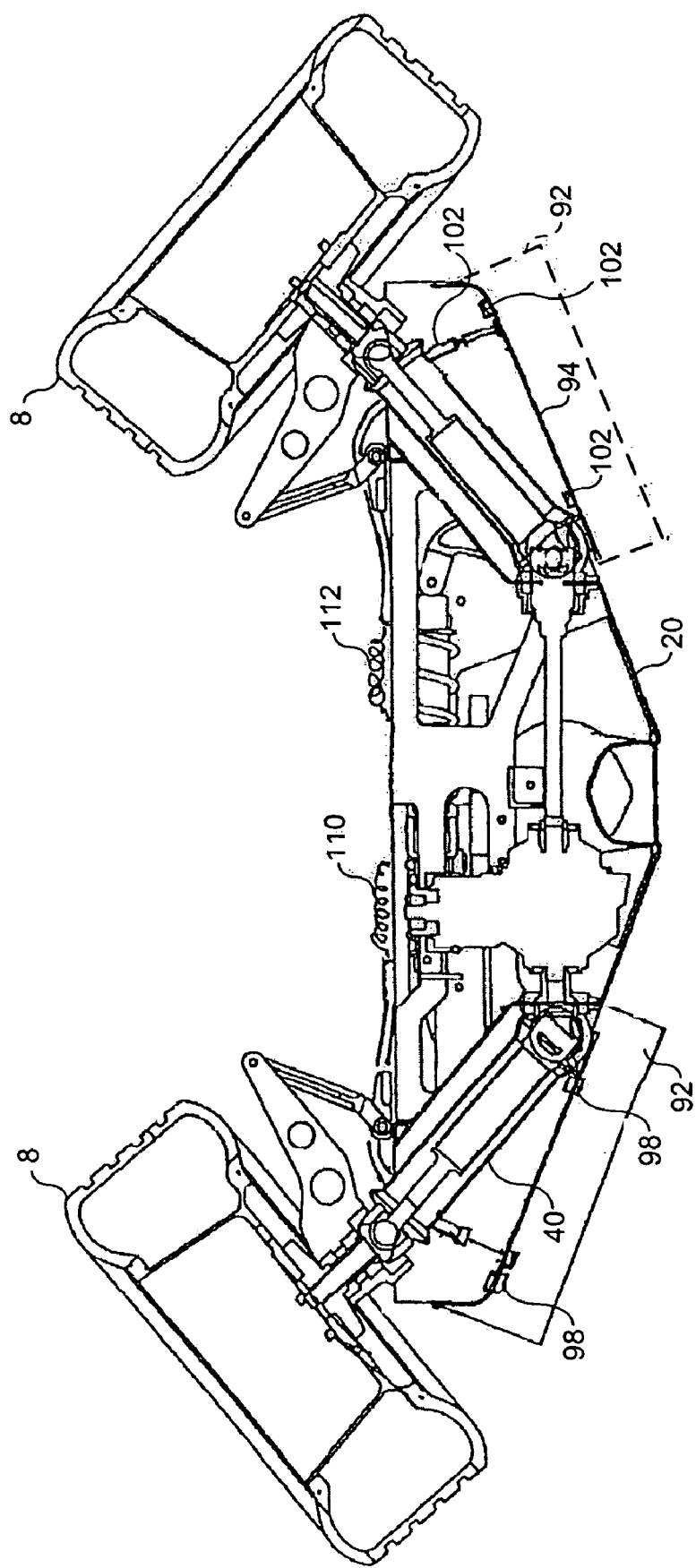
FIG. 5 is a transverse cross section through plane II-II of the vehicle of FIG. 1 according to a second embodiment of the invention, with the wheels retracted.
Figure 6:
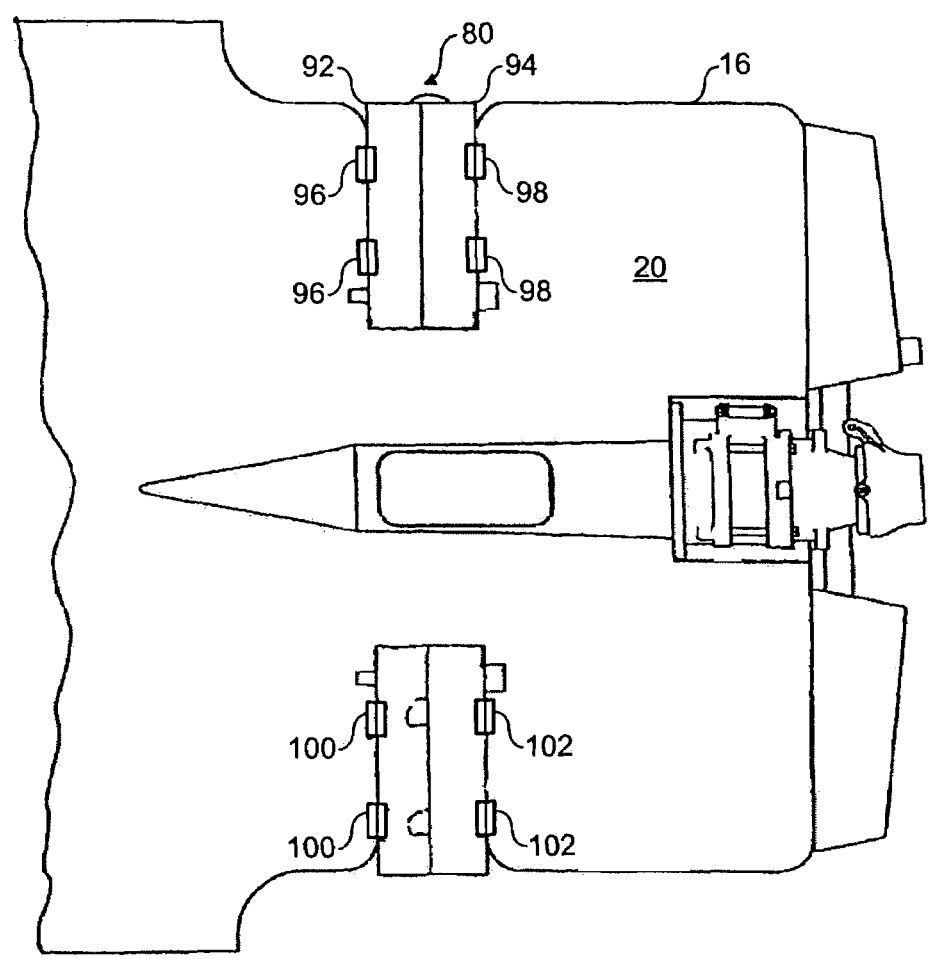
FIG. 6 is a view from below the vehicle of the second embodiment with the wheels retracted.

In order to achieve complete filling of clearance gaps 90, a second embodiment has a pair of covers 92 and 94 for each interruption in the hull surface, which are hinged at 96 and 98 on one side and at 100 and 102 on the other side of the planing surface 20. This is shown in FIGS. 5 and 6. Door 92 is shown figuratively in an open position here, although the suspension is retracted; on the right hand side of the Figure, a dashed outline of the corresponding door is shown.

Each cover 92, 94 of each pair hinges about a transverse axis of the vehicle so as to fill half of each gap 80. The covers are split into pairs in "barn door" style to reduce downward protrusion below the hull surface 20 when the covers are open. The covers may be made flexible to avoid breakage on striking rocks, etc. They may also protect the wheel suspensions from impact damage, e.g. scratching of anti-corrosive coatings. The simplest and most foolproof means of opening these covers is to arrange for them to be held shut by springs 110 and 112 (FIG. 5) when wheels are retracted, and pushed open by the suspension as the wheels protract. Alternatively, mechanical linkages to the wheel suspensions may be arranged. Such linkages could be designed to impart a translating movement to the covers, so that they move transversely across the vehicle before or during deployment.

It may be found that the travel of hull gap covers attached to suspension members is preferred to be less than that of the retractable suspension. Particularly where a narrow hull is combined with a large vee angle, as seen in the Figures, it will be necessary for the wheels to be tipped up at a large angle to the road position to keep them above the water line when cornering on water. In this case, if the covers are constrained to move through the same angles as the lower suspension members, covers which are flush with the hull when the wheels are retracted may hit the ground when the wheels are protracted; conversely, covers which as shown in FIG. 3, clear the ground adequately in road mode, will be drawn up above the hull line when the wheels are retracted.

Figure 7:
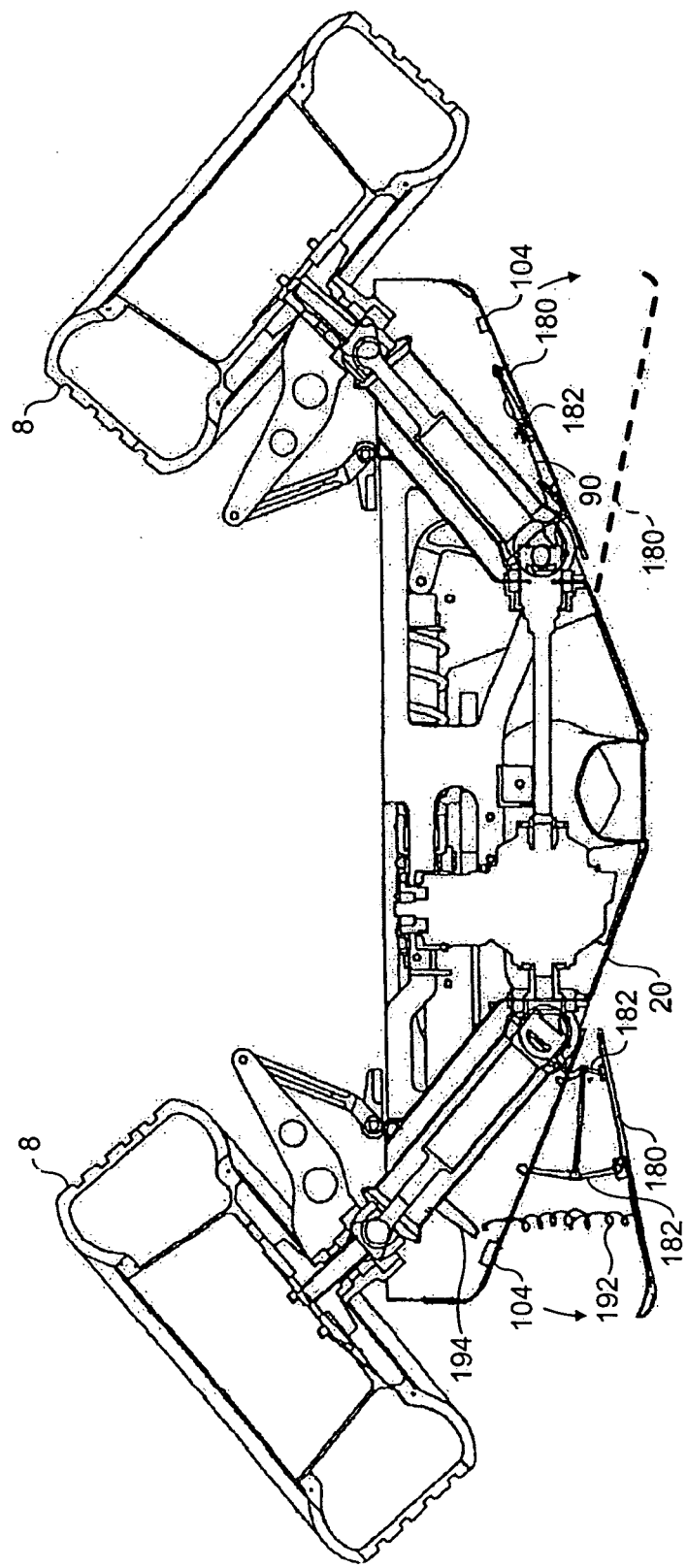
FIG. 7 is a transverse cross section through plane II-II of the vehicle of FIG. 1 according to a third embodiment of the invention, also with the wheels retracted.

This mechanical contradiction may be averted by breaking the fixed mechanical link between the covers and the suspension members. FIG. 7 shows such an arrangement with the wheels retracted. Cover 180 on the right hand side of the Figure (left hand side of the vehicle) is shown retracted, as it would be with the wheels retracted; but cover 180 on the left hand side of the Figure (right hand side of the vehicle) is shown figuratively in a protracted position, to show linkage 182.

When the suspension is protracted, covers 180 are pushed down below planing surface 20 by stops 194 mounted on the lower suspension members. In this position, covers 180 are stabilized by linkages 182. When the suspension is retracted, pins 194 also retract; and covers 180 are pulled up towards surface 20 by tension springs 192, which are tethered above surface 20. The suspension members will be pulled up inside the hull as far as is required to fully retract the wheels; but the covers will be held in place flush against the hull by tabs 104, which are moulded into the hull for this purpose. Alternatively, tabs 104 may be moulded into the covers. Linkages 182 collapse for storage, as shown on the right hand side of the Figure.

The arrangement of FIG. 7 could be modified by replacing cover 180 with a pair of "barn door" covers as shown in FIG. 6, each of the doors being biased closed by a spring, both being engaged by the lower suspension arm 40 (or a pin 194 attached thereto) and both being biased against a stop formed either by a tab extending from the hull or by tabs extending from the covers. The "barn door" covers of this arrangement (or indeed the arrangement of FIG. 7) could be replaced by a single cover hinged at its leading edge (i.e. its edge nearest the front of the vehicle) by a hinge extending transversely of the vehicle; in this way in marine operation the force of water will help keep the cover closed.

Figure 8:
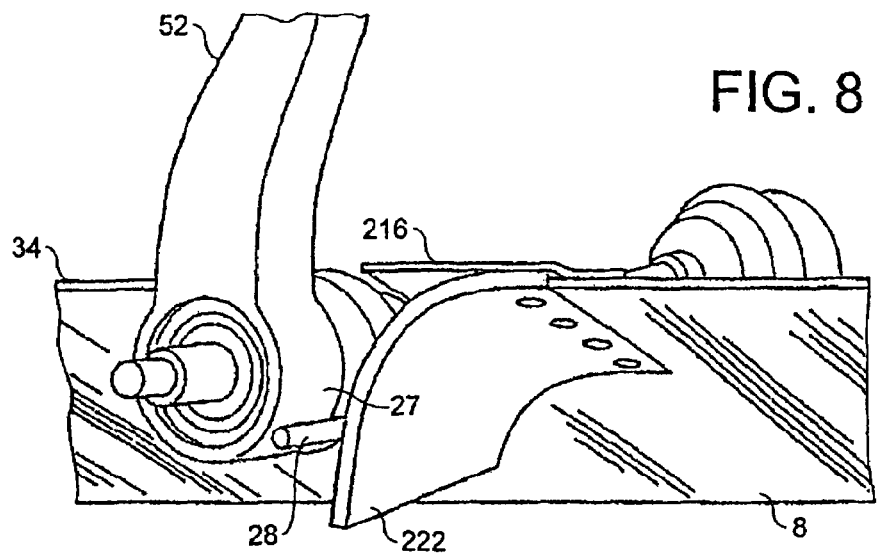
FIG. 8 is a perspective view of an amphibious vehicle having an opening in the hull underside and means for closing the opening in accordance with a fourth embodiment of the present invention.
Figure 9:
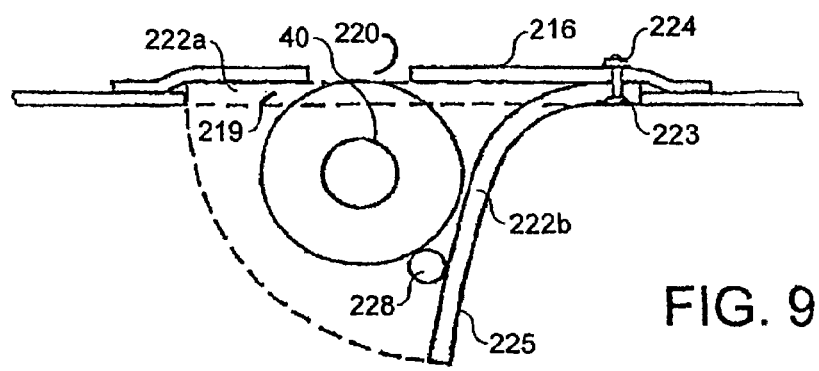
FIG. 9 is a side elevation of the closing means of FIG. 8 showing the lower suspension arm penetrating the opening.

FIGS. 8 and 9 show a means for closing the slots in the vehicle hull when the wheels are retracted. The slot closing means comprises a cover plate 216 attached to the inside of the hull underside and which is arranged to cover the slot. The cover plate 216 can be attached to the hull by any suitable means such as spot welding, seam welding, riveting or by adhesive. The cover plate 216 in the preferred embodiment is attached to the hull adjacent the fore and aft edges of the slot respectively.

The cover plate 216 is contoured, so that the area of the plate above the slot itself lies in a plane slightly inboard of the inner surface of the hull underside to provide a recess 219. The cover plate 216 is provided with an opening 220 which is shaped to provide a small working clearance for the lower suspension arm 40. (In the embodiment, arm 40 takes the form of a driveshaft which is connected to a suspension upright 52).

A resilient cover 222 is attached to the outboard side of the cover plate 216 adjacent to the forward edge of the slot. The cover 222 may be attached to the cover plate by any suitable means. In the embodiment shown, the cover 222 is attached to the cover plate by means of four screws 223 which engage with corresponding nuts 224 on the inner surface of the cover plate. The heads of the screws 223 are countersunk into the cover so that they lie generally flush with the outer surface of the cover.

The cover 222 may be made of rubber, synthetic rubber or any other suitable material. As indicated above, the cover is resilient and the material and the dimensions of the cover are selected to ensure that the cover has a natural tendency to move to the closed position 222a as indicated by the dashed lines in FIG. 9. In FIG. 9 it is illustrated that it is the lower suspension arm 40 which passes through aperture 220 and not the upright 52.

The thickness of the cover and the recess 219 in the cover plate 216 are arranged so that when the cover 222 is in the fully closed position 222a, the outer surface 25 of the cover is substantially flush with and forms a generally continuous surface with the outer surface of the hull underside.

Attached to the lower suspension arm 40 is a peg 228 which deflects the cover 222 downwards from its closed position 222a as the wheel moves to the protracted position for land use. The peg 228 holds the cover clear of the lower suspension arm while the wheel is protracted.

Operation of the cover will now be described.

When the wheel and suspension member are moved to a protracted position, the peg 228 contacts the cover 222 and deflects it downwardly, as shown at 222b in FIG. 9, holding the cover clear of the lower suspension arm. In this position the vehicle is adapted for land use and the lower suspension arm projects through the slot and the opening 220 in the cover plate 216.

When the vehicle is in sufficient depth of water, the wheels can be retracted for waterborne use. As the wheels retract, the lower suspension arm 40 pivots up through the slot and the opening 220 so as to lie inboard. At the same time the resilience in the cover 222 biases the cover towards its closed position 222a within the recess 219. At this stage, water will be present both above and below the cover so that the cover may not fully close initially. However, increasing speed of the vehicle in the water will raise the water pressure on the underside of the cover 222 pressing it into the recess 219 to complete the closure process. It will be apparent that when the cover is in the fully closed position 222a, the cover substantially fills the slot to provide a generally smooth and continuous hull surface.

Figure 10:
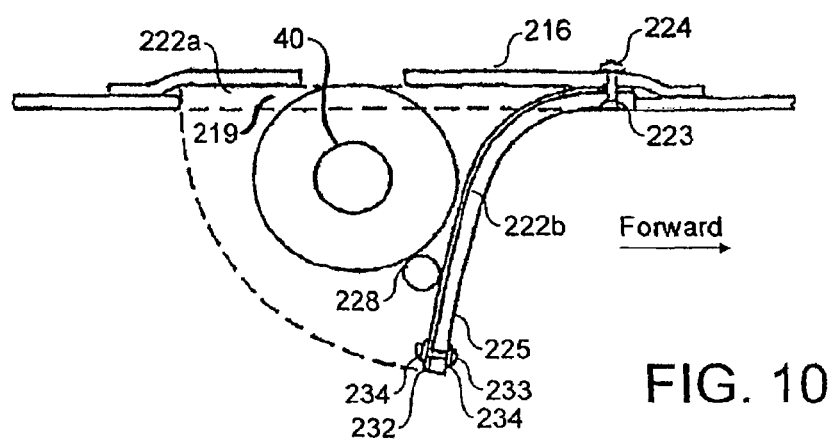
FIG. 10 is a side elevation view similar to that of FIG. 9 showing a modified closing means.

A modification to the cover arrangement is shown in FIG. 10, in which a spring 232 has been added to the cover 222 to ensure that the cover is resiliently biased to the closed position 222a. Such a spring may be required where the natural resilience of the cover material is insufficient to return the cover to the closed position without assistance.

The spring 232 comprises a plate of spring stainless steel which is attached to the inner surface of the cover 222. The spring 232 is fastened to the rearward end of the cover by means of rivets 233 which pass through corresponding holes in the spring 232 and the cover 222. These holes may be oval or oversized round holes to accommodate assembly tolerances, and/or relative movement in service. Washers 234 are provided on the cover side and the spring side to spread the clamping load of the rivets.

The cover 222 and plate spring 232 effectively form a composite cover which is received within the recess 219 when the cover is in the closed position 222a, the depth of the recess 219 being selected such that the outer surface 225 of the cover 222 is flush with the outer surface of the hull underside.

Other forms of spring could also be used to bias the cover 222 towards the closed position. For example coil springs or multi-leaf springs could be used. However, it is considered that a spring made of a plate or strip of stainless steel would be less susceptible to corrosion damage in the salt water environment in which it is required to operate.

While a particular form of the present invention has been illustrated and described, it will also be apparent to those skilled in the art that various modifications can be made without departing from the spirit and the scope of the present invention. For example, the covers described may be applied to a non-driven, and/or a steered, axle. Rather than the lower suspension members being tubular, they may be solid, or wishbones. Accordingly, it is not appended claims.

What is claimed is:

1. An amphibious vehicle having retractable road wheels each mounted by means of a wheel suspension to a vehicle body, the body having a planing bottom, wherein the bottom has for each suspension an interruption in the bottom through which at least a part of the suspension can move during retraction or protraction of its said road wheel, wherein the interruption is arranged to be substantially covered by a cover, wherein said road wheel is outboard of the cover and wherein the cover is engaged by the part of the wheel suspension during wheel protraction so that the cover at least partially opens on wheel protraction.

2. An amphibious vehicle according to claim 1, wherein the cover is hingedly attached to the body by means of a hinge or hinges, with each hinge axis parallel to the vehicle's longitudinal axis.

3. An amphibious vehicle according to claim 1, wherein the cover is hingedly attached to the body by a hinge or hinges, with each hinge axis parallel to the vehicle's transverse axis.

4. An amphibious vehicle according to claim 1, wherein the cover is movably connected to the body by a linkage.

5. An amphibious vehicle according to claim 1, wherein the cover is bracketed to a lower suspension member.

6. An amphibious vehicle according to claim 5, wherein a spring is provided to bias the cover into a position covering the interruption and the cover is constrained to not pass within the hull by tabs projecting from said hull, which abut against said cover as the suspension is retracted.

7. An amphibious vehicle according claim 1, wherein a spring is provided to bias the cover into a position covering the interruption and the cover is constrained to not pass within the hull by tabs projecting from said cover, which abut against the hull as the suspension is retracted.

8. An amphibious vehicle according to claim 1, wherein the cover comprises a buoyant body.

9. An amphibious vehicle according to claim 8, wherein the cover comprises a hollow body.

10. An amphibious vehicle according to claim 1, wherein the cover is made of a resilient material and is secured to the hull along a leading edge of the cover, nearest a bow of the vehicle, transversely across the vehicle.

11. An amphibious vehicle as claimed in claim 10, additionally comprising a resilient spring which acts on the cover to bias the cover closed.

12. An amphibious vehicle comprising:
a vehicle body which comprises a hull having a planing surface;
an engine;
a plurality of road wheels at least one of which can be driven by the engine;
a suspension arrangement connecting the road wheels to the vehicle body comprising suspension arms to which wheel hub assemblies for the road wheels are attached; and
a wheel retraction system for moving at least some of the road wheels between a lowered ground-engaging location for land mode operation and a raised location for on-water operation; wherein:
apertures are provided in the planing surface through which the suspension arms of at least some of the retractable wheels extend when the road wheels are in their ground-engaging locations;

covers are provided for at least partially closing the planing surface apertures when the relevant road wheels are retracted; and wherein each cover is interconnected with an associated suspension arm during at least part of each lowering of a relevant road wheel, the movement of the suspension arm being thereby relayed to the cover to open the cover.

13. An amphibious vehicle as claimed in claim 12 wherein the cover is interconnected with said arm by a bracket to permanently link each cover with the associated suspension arm so that they move together.

14. An amphibious vehicle as claimed in claim 13, wherein each cover is hingedly attached to the vehicle body, each cover is biased closed and an abutment is provided on each relevant suspension arm which comes into abutment with a part of the cover during lowering of the road wheels.

15. An amphibious vehicle as claimed in claim 14, wherein the hinge of each cover extends longitudinally along the vehicle.

16. An amphibious vehicle as claimed in claim 14, wherein the hinge of each cover extends transversely across the vehicle.

17. An amphibious vehicle as claimed in claim 14, wherein a stop is provided within each aperture for limiting closing motion of each cover.

18. An amphibious vehicle as claimed in claim 14, wherein a stop is provided on each cover which engages a part of the vehicle body to limit closing motion of the cover.

19. An amphibious vehicle as claimed in claim 12, wherein the cover is made of resilient material and is secured to the hull along a leading edge of the cover, nearest a bow of the vehicle, transversely across the vehicle.

20. An amphibious vehicle as claimed in claim 19, additionally comprising a resilient spring which acts in the cover to bias the cover closed.

* * * * *

UNITED STATES PATENT AND TRADEMARK OFFICE
CERTIFICATE OF CORRECTION

| | | |
|---|---|---|
| PATENT NO. | : 7,322,864 B2 | Page 1 of 1 |
| APPLICATION NO. | : 11/255775 | |
| DATED | : January 29, 2008 | |
| INVENTOR(S) | : Longdill et al. | |

It is certified that error appears in the above-identified patent and that said Letters Patent is hereby corrected as shown below:

Column 6, line 6, after the word "not" insert --intended that the invention be limited except by the--.

Column 8, line 18, delete "in" and insert --on--.

Signed and Sealed this

Twenty-ninth Day of July, 2008

JON W. DUDAS
*Director of the United States Patent and Trademark Office*